US012007764B2

(12) United States Patent
Bash et al.

(10) Patent No.: US 12,007,764 B2
(45) Date of Patent: Jun. 11, 2024

(54) SYSTEM AND METHOD FOR AERIAL TRAFFIC MANAGEMENT OF UNMANNED AERIAL VEHICLES

(71) Applicant: Flytrex Aviation Ltd., Tel Aviv (IL)

(72) Inventors: Yariv Bash, Tel Aviv (IL); Amit Regev, Tel Aviv (IL)

(73) Assignee: Flytrex Aviation Ltd., Tel Aviv (IL)

(*) Notice: Subject to any disclaimer, the term of this patent is extended or adjusted under 35 U.S.C. 154(b) by 783 days.

(21) Appl. No.: 17/092,714

(22) Filed: Nov. 9, 2020

(65) Prior Publication Data
US 2021/0141373 A1 May 13, 2021

Related U.S. Application Data

(63) Continuation-in-part of application No. 16/247,034, filed on Jan. 14, 2019, now Pat. No. 11,029,682,
(Continued)

(51) Int. Cl.
G05D 1/00 (2006.01)
B64C 39/00 (2023.01)
(Continued)

(52) U.S. Cl.
CPC ......... *G05D 1/0027* (2013.01); *B64C 39/024* (2013.01); *G05D 1/0094* (2013.01);
(Continued)

(58) Field of Classification Search
CPC .. G05D 1/0027; G05D 1/0094; G05D 1/0061; G05D 1/1064; B64C 39/024;
(Continued)

(56) References Cited

U.S. PATENT DOCUMENTS 5,799,263 A 8/1998 Culbertson
8,615,473 B2 12/2013 Spiegel et al.
(Continued)

FOREIGN PATENT DOCUMENTS

BR 112017021483 A2 7/2018
CN 107614375 A 1/2018
(Continued)

OTHER PUBLICATIONS

The Fourth European Office Action for European Patent Application No. 17837369.2, dated Oct. 8, 2021, EPO, Munich, Germany.
(Continued)

*Primary Examiner* — Mahmoud S Ismail
(74) *Attorney, Agent, or Firm* — M&B IP Analysts, LLC

(57) ABSTRACT

A system and method for aerial traffic management of unmanned aerial vehicles (UAVs) are provided. The method includes receiving at least a navigation request from a first UAV of a plurality of UAVs, wherein the navigation request specifies at least a waypoint; determining whether the waypoint is clear; sending an instruction the first UAV to hover at a specified position until the waypoint is clear, when the received waypoint is not clear; locking the waypoint, when the received waypoint not clear; and instructing the first UAV to navigate to the received waypoint.

19 Claims, 11 Drawing Sheets

Related U.S. Application Data which is a continuation of application No. 15/646,729, filed on Jul. 11, 2017, now Pat. No. 10,191,485, and a continuation-in-part of application No. 15/447,452, filed on Mar. 2, 2017, now Pat. No. 10,274,949.

(60) Provisional application No. 62/932,203, filed on Nov. 7, 2019, provisional application No. 62/361,711, filed on Jul. 13, 2016, provisional application No. 62/326,787, filed on Apr. 24, 2016.

(51) Int. Cl.
| | |
|---|---|
| *B64C 39/02* | (2023.01) |
| *G08G 5/00* | (2006.01) |
| *B64U 101/60* | (2023.01) |
| *G06Q 10/0832* | (2023.01) |

(52) U.S. Cl.
CPC ......... *G08G 5/0013* (2013.01); *G08G 5/0034* (2013.01); *G08G 5/0043* (2013.01); *G08G 5/0069* (2013.01); *G08G 5/0082* (2013.01); *B64U 2101/60* (2023.01); *B64U 2201/20* (2023.01); *G05D 1/0061* (2013.01); *G06Q 10/0832* (2013.01)

(58) Field of Classification Search
CPC .. G08G 5/0013; G08G 5/0034; G08G 5/0043; G08G 5/0069; G08G 5/0082; B64U 2101/60; B64U 2201/20; B64U 10/13; G06Q 10/0832; G06Q 10/083
USPC .............................................................. 701/2
See application file for complete search history.

(56) References Cited

U.S. PATENT DOCUMENTS

| | | | |
|---|---|---|---|
| 8,914,182 | B2 | 12/2014 | Casado et al. |
| 9,082,293 | B2 | 7/2015 | Wellman et al. |
| 9,102,406 | B2 | 8/2015 | Stark et al. |
| 9,221,538 | B2 | 12/2015 | Takahashi et al. |
| 9,368,026 | B1 | 6/2016 | Herbach et al. |
| 9,731,839 | B1 | 8/2017 | Beckman et al. |
| 9,852,642 | B2 | 12/2017 | Butler et al. |
| 10,372,142 | B2 | 8/2019 | Venturelli |
| 2004/0044444 | A1 | 3/2004 | Johnson et al. |
| 2006/0161440 | A1 | 7/2006 | Nakayama et al. |
| 2008/0300737 | A1 | 12/2008 | Sacle et al. |
| 2010/0070124 | A1 | 3/2010 | Yeager et al. |
| 2012/0237028 | A1 | 9/2012 | Khazan et al. |
| 2013/0096818 | A1* | 4/2013 | Vicharelli ............ B60W 40/10 701/423 |
| 2013/0261945 | A1 | 10/2013 | Marcy et al. |
| 2014/0032034 | A1 | 1/2014 | Raptopoulos et al. |
| 2014/0254896 | A1 | 9/2014 | Zhou et al. |
| 2014/0339372 | A1 | 11/2014 | Dekel et al. |
| 2015/0073624 | A1 | 3/2015 | Takahashi et al. |
| 2015/0154136 | A1 | 6/2015 | Markovic et al. |
| 2015/0370251 | A1 | 12/2015 | Siegel et al. |
| 2015/0379874 | A1 | 12/2015 | Ubhi et al. |
| 2016/0018230 | A1 | 1/2016 | Neubecker et al. |
| 2016/0033966 | A1 | 2/2016 | Farris et al. |
| 2016/0039300 | A1 | 2/2016 | Wang et al. |
| 2016/0068264 | A1 | 3/2016 | Ganesh et al. |
| 2016/0125735 | A1 | 5/2016 | Tuukkanen |
| 2016/0260332 | A1 | 9/2016 | Downey et al. |
| 2016/0274578 | A1 | 9/2016 | Arwine |
| 2016/0371987 | A1* | 12/2016 | Kotecha ............... G05D 1/0022 |
| 2017/0011340 | A1 | 1/2017 | Gabbai |
| 2017/0013413 | A1* | 1/2017 | Singh ................. H04B 7/18506 |
| 2017/0090484 | A1 | 3/2017 | Obaidi |
| 2017/0129603 | A1 | 5/2017 | Raptopoulos et al. |
| 2017/0225792 | A1 | 8/2017 | Wang et al. |
| 2017/0235018 | A1 | 8/2017 | Foster et al. |
| 2017/0316621 | A1 | 11/2017 | Jefferies et al. |
| 2018/0044000 | A1 | 2/2018 | Venturelli et al. |
| 2018/0047295 | A1* | 2/2018 | Ricci ....................... G05D 1/104 |
| 2018/0188747 | A1 | 7/2018 | Venturelli |
| 2018/0253979 | A1* | 9/2018 | Rey ...................... G08G 5/0069 |
| 2018/0356841 | A1* | 12/2018 | Zilberstein ............... B64D 5/00 |

FOREIGN PATENT DOCUMENTS

| | | |
|---|---|---|
| CN | 107924190 A | 4/2018 |
| EP | 2767962 A1 | 8/2014 |
| EP | 3280638 A1 | 2/2018 |
| EP | 3314344 A1 | 5/2018 |
| EP | 3280638 A4 | 12/2018 |
| EP | 3314344 A4 | 2/2019 |
| IN | 201727035253 | 12/2017 |
| MX | 2017012941 A | 11/2018 |
| RU | 2217797 C2 | 11/2003 |
| WO | 2015061008 A1 | 4/2015 |
| WO | 2015160672 A1 | 10/2015 |
| WO | 2016164416 A1 | 10/2016 |
| WO | 2016210156 A1 | 12/2016 |

OTHER PUBLICATIONS

The Supplementary European Search Report and Search Opinion for EP Application No. 17837369.2, Munich, Germany, dated Jan. 16, 2020.
The Third European Office Action for European Patent Application No. 17837369.2 dated May 27, 2021, EPO, Munich, Germany.
Notice of Deficiencies for European Patent Application No. 17837369.2, dated Sep. 3, 2020, EPO, Munich, Germany.
The European Search Report for EP Application No. 17837369.2, The European Patent Office, The Hague: dated Jan. 23, 2020.
The International Search Report and the Written Opinion for PCT/US2017/041514, ISA/RU, Moscow, Russia, dated Apr. 12, 2018.
Notice of Deficiencies for European Patent Application No. 17837369.2, dated Jan. 15, 2021, EPO, Munich, Germany.

* cited by examiner

SYSTEM AND METHOD FOR AERIAL TRAFFIC MANAGEMENT OF UNMANNED AERIAL VEHICLES

CROSS-REFERENCE TO RELATED APPLICATIONS

This application claims the benefit of U.S. Provisional Application No. 62/932,203, filed on Nov. 7, 2019. This application is also a continuation-in-part of U.S. application Ser. No. 16/247,034, filed on Jan. 14, 2019, which is a continuation of U.S. application Ser. No. 15/646,729, filed on Jul. 11, 2017, now U.S. Pat. No. 10,191,485, the Ser. No. 15/646,729 application claims the benefit of U.S. Provisional Application No. 62/361,711, filed on Jul. 13, 2016. The Ser. No. 16/247,034 application is also a continuation-in-part of U.S. application Ser. No. 15/447,452, now U.S. Pat. No. 10,274,949, filed on Mar. 2, 2017, which claims the benefit of U.S. Provisional Application No. 62/326,787, filed on Apr. 24, 2016, the contents of which aforementioned references are hereby incorporated by reference.

TECHNICAL FIELD

The disclosure generally relates to aerial traffic management and, particularly, to aerial traffic management of unmanned vehicles.

BACKGROUND

Unmanned vehicles, on land, air or sea, are increasingly being used for various tasks. As these vehicles become prevalent, it becomes imperative to manage traffic to prevent congestion and increase safety. High densities of vehicles moving at fast speeds may lead to collisions which, other than causing financial harm, may also cause unintended harm to people and property in the vicinity of the collision. Aerial navigation is also more complicated than navigation in other spaces, due, in part, to the requirement of navigating a three-dimensional space, which is not the case for land or sea.

Conventional solutions for air-traffic management, such as manual coordination of aircraft by a central control tower, provide for traffic-management in limited circumstances, but fail to address the difficulties of management of unmanned vehicles. Such manual coordination fails to provide for rapid, automated, management of large fleets of unmanned vehicles, limiting communications between a control center and the various vehicles to the speed with which human operators can direct traffic. Further, such manual traffic-management solutions are primarily directed toward manned aircraft, limiting the applicability of such solutions to cases in which a control operator can direct vehicles based on a dialogue with a vehicle operator. As a result, manual control-center modes of air traffic management fail to provide for the automated management of large fleets of unmanned vehicles.

In addition, certain de-centralized air traffic management solutions, including the "free flight" model, provide for management of air traffic without the inclusion of a central controller, providing aircraft with airspace authorizations on the basis of pre-defined restrictions and the needs of various aircraft. Such de-centralized solutions may provide for assignment of airspace to vehicles based on factors including the vehicles' types and courses, the airspaces assigned to nearby vehicles, and the like. In such de-centralized schemes, safe separation between vehicles may be provided by relying on pilots or operators to maintain a safe distance, by automatically allocating airspace to provide for safe separation, or a combination thereof. While de-centralized solutions provide solutions to some of the limitations of manned air traffic control, such solutions may fail to address the traffic management requirements posed by large fleets of unmanned vehicles.

Where de-centralized traffic management schemes are applied to manage airspace, the solutions discussed in the related art may fail to account for unmanned or automatically-piloted vehicles, such as delivery drones. Such vehicles may be incapable of communicating with human pilots to establish safe separation plans, and operators of large fleets of unmanned vehicles may be unable to conduct such communications for multiple vehicles at the same time. Further, such de-centralized solutions may be directed primarily to management of air traffic in flight, and may fail to provide for automatic determination of safe takeoff and landing plans, particularly for multiple unmanned vehicles. As a result, current de-centralized traffic management methods may fail to provide for management of air traffic for large fleets of unmanned vehicles.

Therefore, a system which could provide a solution to manage aerial traffic and increase safety by reducing the probability for a collision to occur would be beneficial.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for aerial traffic management of unmanned aerial vehicles (UAVs). The method comprises receiving at least a navigation request from a first UAV of a plurality of UAVs, wherein the navigation request specifies at least a waypoint; determining whether the waypoint is clear; sending an instruction the first UAV to hover at a specified position until the waypoint is clear, when the received waypoint is not clear; locking the waypoint, when the received waypoint not clear; and instructing the first UAV to navigate to the received waypoint.

Certain embodiments disclosed herein also include a non-transitory computer-readable medium having stored thereon instructions for causing a processing circuitry to execute a process, the process comprising: receiving at least a navigation request from a first UAV of a plurality of UAVs, wherein the navigation request specifies at least a waypoint; determining whether the waypoint is clear; sending an instruction the first UAV to hover at a specified position until the waypoint is clear, when the received waypoint is not clear; locking the waypoint, when the received waypoint not clear; and instructing the first UAV to navigate to the received waypoint.

In addition, certain embodiments disclosed herein include a system for aerial traffic management of unmanned aerial vehicles (UAVs). The system comprises: a processing circuitry; and a memory, the memory containing instructions that, when executed by the processing circuitry, configure the system to: receive at least a navigation request from a first UAV of a plurality of UAVs, wherein the navigation request specifies at least a waypoint; determine whether the waypoint is clear; send an instruction the first UAV to hover at a specified position until the waypoint is clear, when the received waypoint is not clear; lock the waypoint, when the received waypoint not clear; and instruct the first UAV to navigate to the received waypoint.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
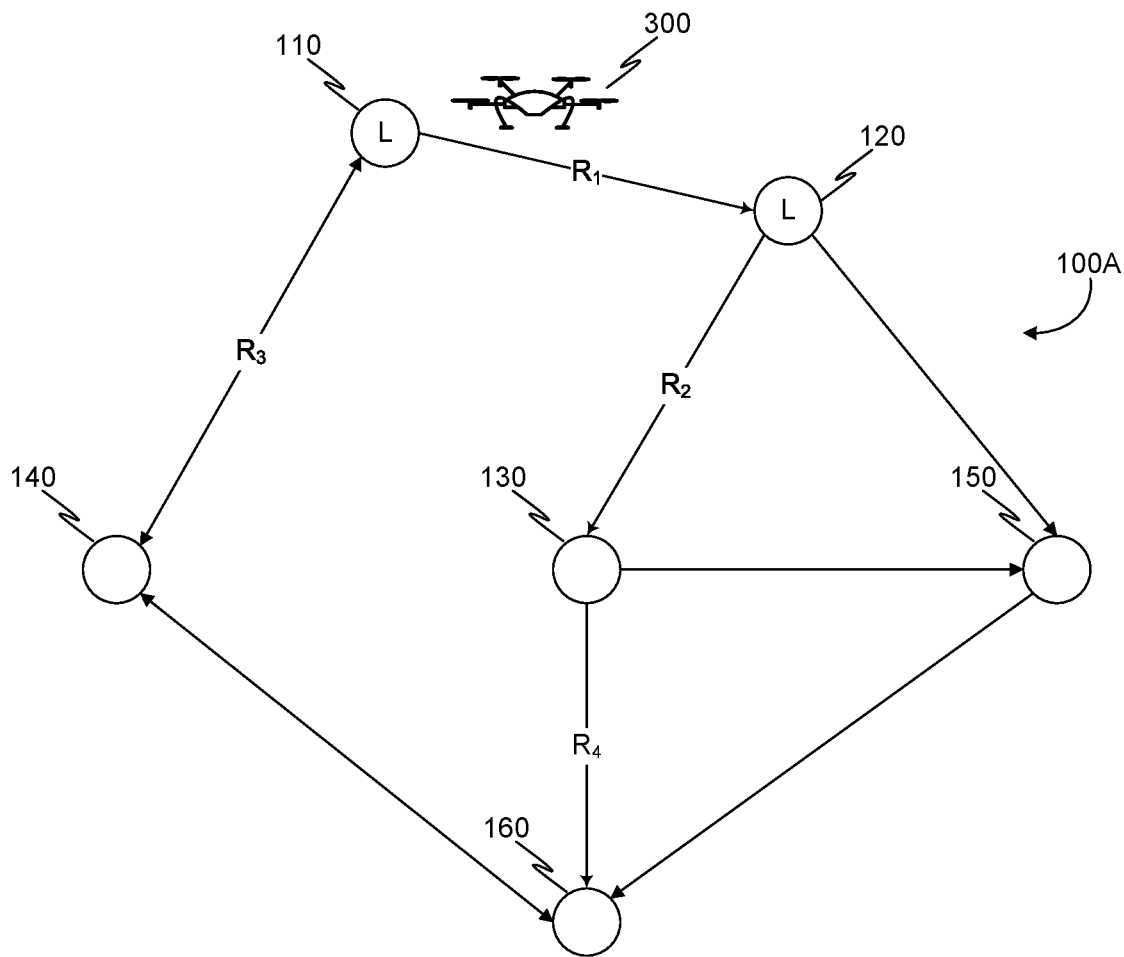
FIG. 1A is a navigation model graph for managing air traffic for a plurality of unmanned aerial vehicles (UAVs), utilized in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A system for aerial traffic management for unmanned aerial vehicles (UAVs) includes a central control server which generates navigation plans for each UAV. Each navigation plan includes a plurality of waypoints. UAVs navigate between waypoints to their destinations, such that when a UAV navigates between a first waypoint and a second waypoint, the control server locks the waypoints for exclusive use by the UAV.

FIG. 1A is an example navigation model graph 100A for managing air traffic for a plurality of unmanned aerial vehicles (UAVs), utilized according to an embodiment. The navigation model graph 100A (also referred to as a 'graph,' 100A) includes a plurality of waypoints 110, 120, 130, 140, 150 and 160. A waypoint is a composite data feature and may include, without limitation, a location, such as, as an example and without limitation, a location specified by GPS or other coordinates, a route hover height, an emergency hover height, and the like, as well as any combination thereof. A waypoint may further include a ground height, used for landing or takeoff, such as, for example, in the case that the waypoint is a landing point. A waypoint may further include one or more route vectors, where such route vectors may form a path from one waypoint to another.

In some embodiments, the route vector may be one-directional (i.e. only from waypoint 110 to waypoint 120), such as R1, or may be multi-directional, such as R3 (from waypoint 110 to waypoint 140 and from waypoint 140 to waypoint 110). When a UAV, such as UAV 300, navigates from a first loading location waypoint 110 to a second waypoint 120 via vector R1, both waypoints, 110 and 120, may be locked by a control server, which may provide for controlling the UAV and sending the UAV navigation instructions. In an embodiment, a single waypoint may be locked, for example, if a UAV occupies the waypoint, providing for locking of only that waypoint. A locked waypoint may not be used by another UAV, and the control server may not allow a UAV to navigate to a locked waypoint. Throughout this disclosure, "UAV" and "drone" are used interchangeably.

Figure 1B:
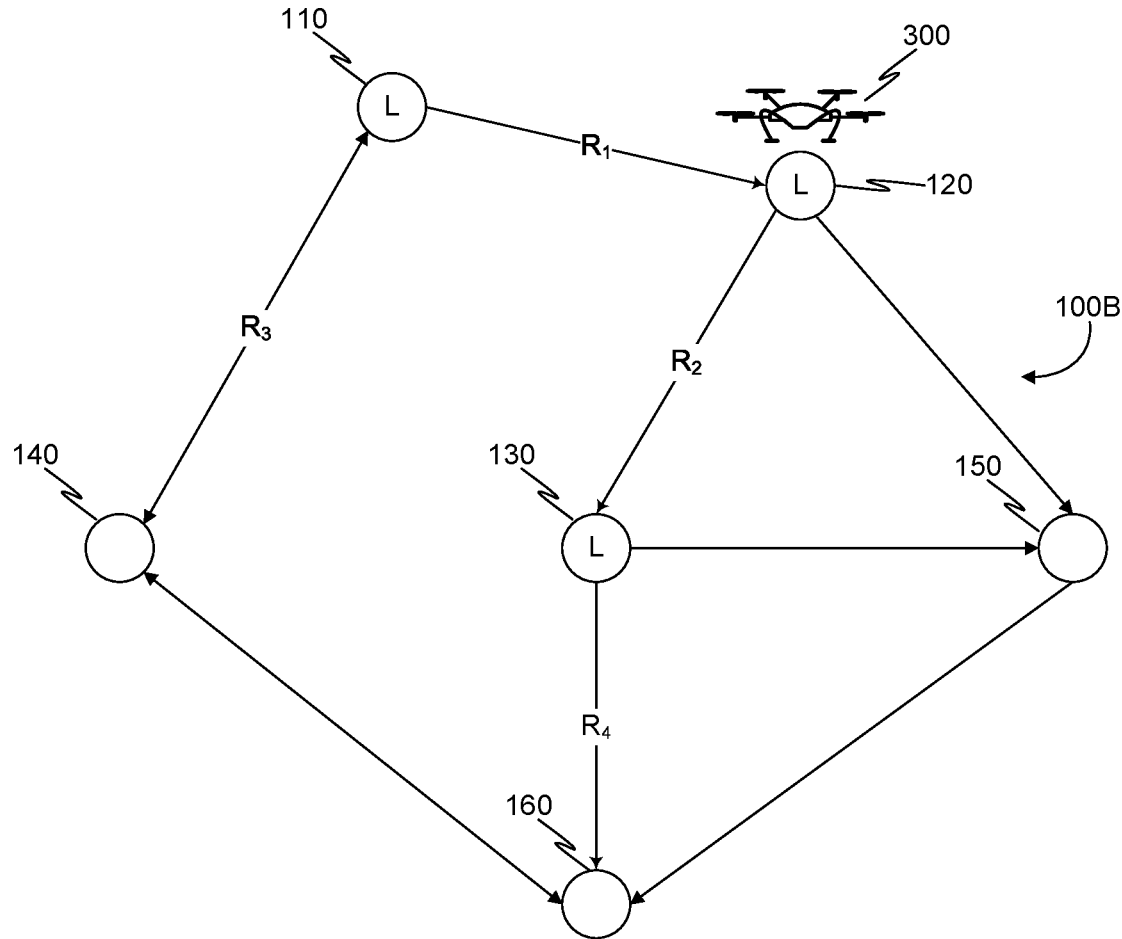
FIG. 1B is a navigation model graph for managing air traffic for a plurality of unmanned aerial vehicles (UAVs), utilized in accordance with another embodiment.

FIG. 1B is an example navigation model graph 100B for managing air traffic for a plurality of unmanned aerial vehicles (UAVs), utilized according to an embodiment. In the graph 100B, as a UAV 300 approaches the waypoint 120, the UAV sends a request, over a wireless network, to the control server, described in further detail below, where the request may include, as an example and without limitation, a request for instructions for navigating to the next waypoint. In an embodiment, the UAV 300 may receive an entire flight plan from the control server prior to departure. In another embodiment, the UAV 300 may receive only instructions for navigating to the next waypoint.

In another embodiment, the UAV 300 may receive a group of next waypoints, and an order in which to traverse them. In some embodiments, the UAV 300 sends a request to the server prior to navigating to the next waypoint. In an example, the next waypoint is a waypoint 130, reached via route vector R2. The control server may perform a check to determine if the next waypoint is locked and, if not, the control server may lock the next waypoint for use by the UAV 300. If the next waypoint is locked, the control server may instruct the UAV 300 to hover at the current waypoint 120, including at a hover height specified in the waypoint's description.

Upon locking the next waypoint, the server may send an instruction to the UAV 300 to progress to the next waypoint. In an embodiment, if the UAV 300 does not receive a control instruction from the control server, the UAV 300 will continue to hover at the last authorized waypoint. The UAV 300 may continue to hover until an energy storage supplying power to the UAV 300 is depleted, at which point the drone may be configured to perform an emergency landing at the coordinates of the current waypoint. In an embodiment, the waypoints correspond to coordinates where an emergency landing will lead to little or no danger to humans or, at least, little or no danger to a civilian population. In another embodiment, the UAV 300 may be sent instructions which configure the UAV 300 to return to the loading location waypoint 110, including, without limitation, via the same waypoints, in reverse order, as long as such waypoints are not locked for use by another UAV 300.

Figure 1C:
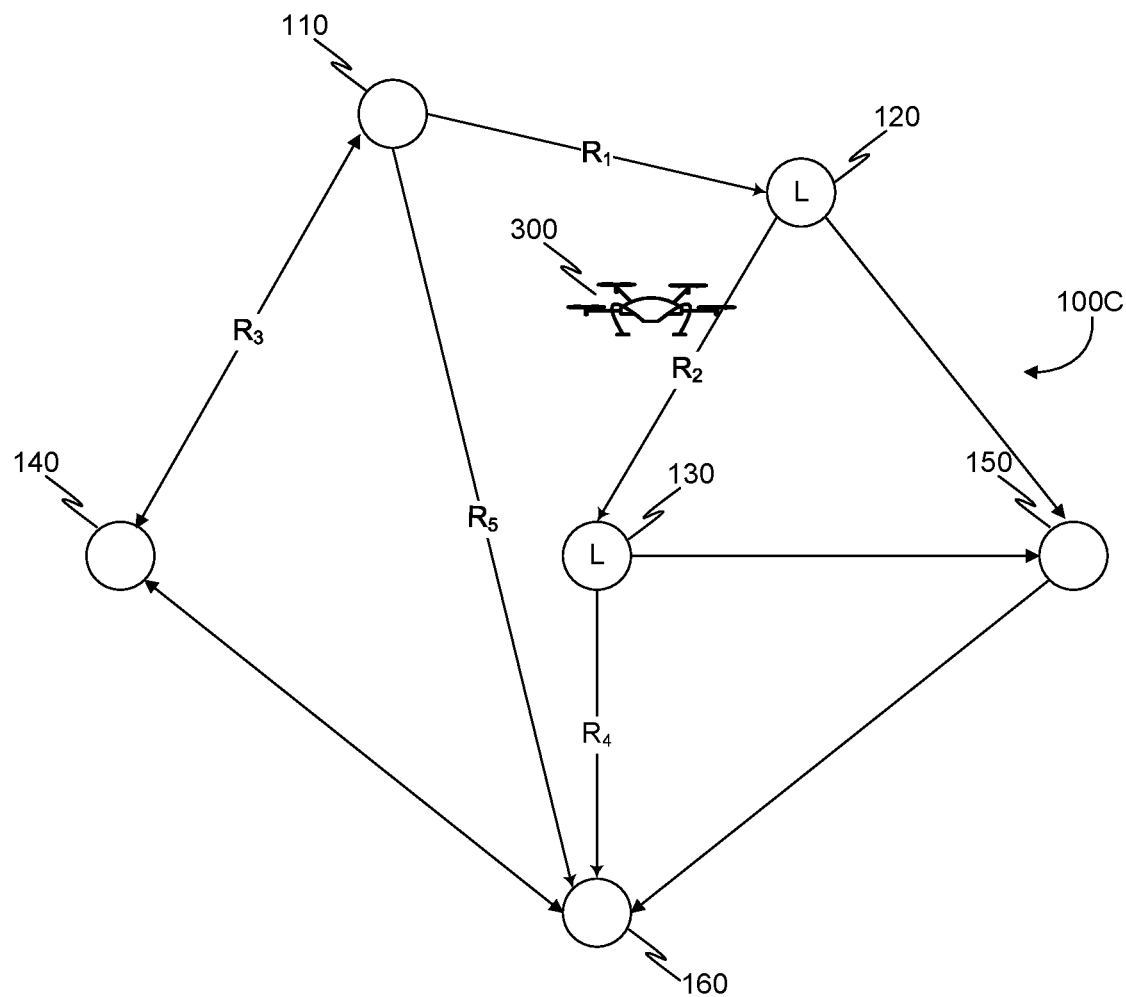
FIG. 1C is a navigation model graph for managing air traffic for a plurality of unmanned aerial vehicles (UAVs), utilized in accordance with yet another embodiment.

FIG. 1C is an example navigation model graph 100C for managing air traffic for a plurality of unmanned aerial vehicles (UAVs), utilized according to an embodiment. In response to receiving approval to progress to waypoint 130 from waypoint 120, the control server may determine that loading location waypoint 110 may be unlocked, thus freeing use of the loading location waypoint 110 for use by another UAV. By locking both an initial waypoint (e.g. waypoint 120) and a destination waypoint (e.g. waypoint 130), the control server may determine, in the event of an emergency, to send the UAV 300 to the closest of the two waypoints.

In an embodiment, the UAV 300 may be configured to detect emergency events. For example, loss of communication with the control server may be an emergency event. In another example, the UAV 300 may use accelerometer sensors to determine a direction of movement between two waypoints. Sensor data from the accelerometers may be stored and used to determine where the UAV has been. Thus, if the UAV 300 experiences loss of a navigation system (e.g. the UAV 300 cannot determine a GPS position), the accelerometer sensor data may be used to backtrack the UAV's 300 movement in order return to the last waypoint, such as waypoint 120. Such embodiments may provide for enhanced safety due to a reduced likelihood that the UAV 300 will crash into another aerial vehicle, provided that the waypoints for the UAV 300 remain locked by the server. Such embodiments provide for, at any given time, at least two waypoints which can serve as emergency landing sites for UAVs operating under this navigation scheme, providing for increased safety of human population by decreasing the likelihood that a UAV 300 will land in vicinity of the human populations.

In some embodiments, a route vector between two waypoints may be determined based on the type of UAV 300 performing the navigation. For example, the control server may specify that UAV flight time between any two waypoints must be at or below a threshold time value. A faster UAV 300 may, therefore, cover more area in the given amount of time. In an example, a UAV 300 is not fast enough to complete the route vector R5 between loading location waypoint 110 and waypoint 160 and, therefore, in order to reach waypoint 160, the UAV 300 must navigate from loading location waypoint 110 to waypoint 120, from waypoint 120 to waypoint 130, and, finally, from waypoint 130 to waypoint 160. In some embodiments, the distance between waypoints may not exceed a certain distance threshold value.

Figure 2:
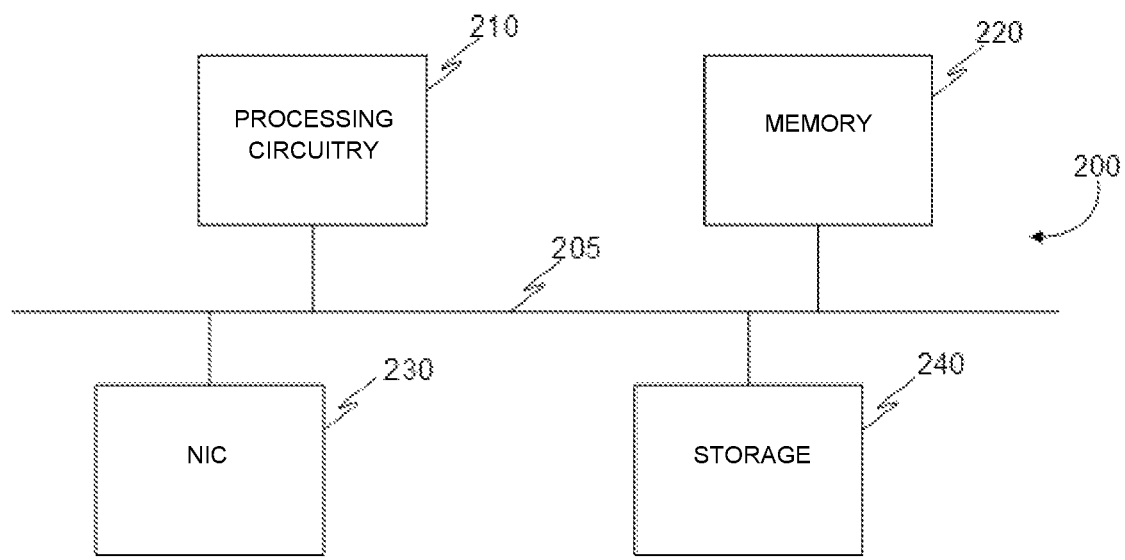
FIG. 2 is a schematic illustration of a control server implemented according to an embodiment.

FIG. 2 is an example schematic illustration of a control server 200 implemented according to an embodiment.

The server 200 includes at least one processing circuitry 210. In an embodiment, the processing circuitry 210 may be, or be a component of, a larger processing unit implemented with one or more processors. The one or more processors may be implemented with any combination of general-purpose microprocessors, microcontrollers, digital signal processors (DSPs), central processing units (CPUs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry 210 is coupled via a bus 205 to a memory 220.

The memory 220 may include a memory portion which contains instructions which, when executed by the processing circuitry 210, configure the processing circuitry 210 to perform the methods described in greater detail herein. The memory 220 may be further used as a working scratch pad for the processing circuitry 210, a temporary storage, and the like, as well as any combination thereof. The memory 220 may be a volatile memory such as, but not limited to random access memory (RAM), or non-volatile memory (NVM), such as, but not limited to, Flash memory.

The processing circuitry 210 may be further coupled to a network interface controller (NIC) 230, and a storage device 240. The NIC 230 may provide for connecting the control server 200 to a network, such as the network described in greater detail hereinbelow. Through the network, the control server 200 may communicate with one or more UAVs and send control and navigation instructions to each.

The storage device 240 may store therein one or more maps, graphs, and the like, each of which includes a plurality of waypoints, from which the control server 200 may generate a navigation plan for a UAV, the generated navigation plan beginning at an initial, or loading location, waypoint and terminating either at a destination waypoint or at the initial waypoint. A terminal waypoint of a first navigation leg of a navigation plan may be an initial waypoint for a second navigation leg. The waypoints may be stored as a graph data structure, such as is depicted with respect to FIGS. 1A through 1C, above. The storage device 240 may be further used for the purpose of holding copies of instructions relevant to the methods executed in accordance with the disclosed techniques.

The processing circuitry 210, the memory 220, the storage device 240, or any combination thereof, may further include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Figure 3:
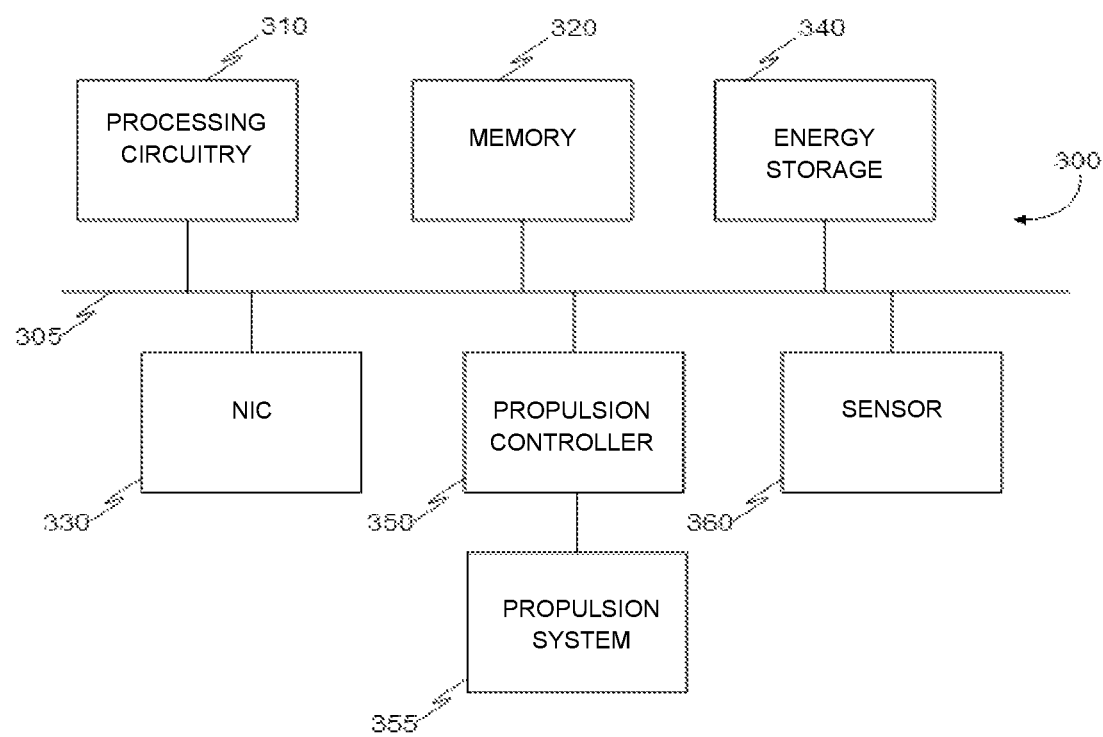
FIG. 3 is a schematic illustration of a UAV implemented according to an embodiment.

FIG. 3 is an example schematic illustration of a UAV 300 implemented according to an embodiment.

The UAV 300 includes at least one processing circuitry 310. In an embodiment, the processing circuitry 310 may be, or may be a component of, a larger processing unit implemented with one or more processors, examples of which are provided above.

The processing circuitry 310 is coupled via a bus 305 to a memory 320. The memory 320 may include a memory portion which contains instructions which, when executed by the processing circuitry 310, configure the processing circuitry 310 to perform the methods described in greater detail herein. The memory 320 may be further used as a working scratch pad for the processing circuitry 310, as a temporary storage, and others, and the like, as well as any combination thereof. The memory 320 may be a volatile memory such as, without limitation, random access memory (RAM), or non-volatile memory (NVM), such as, without limitation, Flash memory. The processing circuitry 310 may be coupled to a network interface controller (NIC) 330, an energy storage 340, a propulsion controller 350, and a sensor array 360.

The NIC 330 may provide for connecting the UAV 300 to a network, such as the network described in greater detail below. Through the network, the UAV 300 may communicate with a control server 200 for purposes including, without limitation, receiving control and navigation instructions from the control server 200, other, like, functions, and any combination thereof.

An energy storage 340 may include, without limitation, one or more batteries, battery packs, supercapacitors, and the like, as well as any combination thereof. In an embodiment, the energy storage 340 may be connected to an environmental energy source, such as, for example, a solar panel, which may be configured to supply power to the energy storage 340.

The propulsion controller 350 is coupled with a propulsion system 355. The propulsion system 355 may provide the drone with a thrust force, as well as actuation of various sub-components of the propulsion system 355 to control the amount of force and the direction in which such force is applied, providing for the maneuverability of the UAV 300. For example, the propulsion system 355 may include a quadcopter (i.e. 4 propellers) and corresponding motors.

The sensor array 360 may include one or more sensors which are used by the UAV 300. Sensors may include, without limitation, altimeters, accelerometers, photosensors, positioning systems, and the like, as well as any combination thereof.

The processing circuitry 310, the memory 320, or both, may further include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Figure 4:
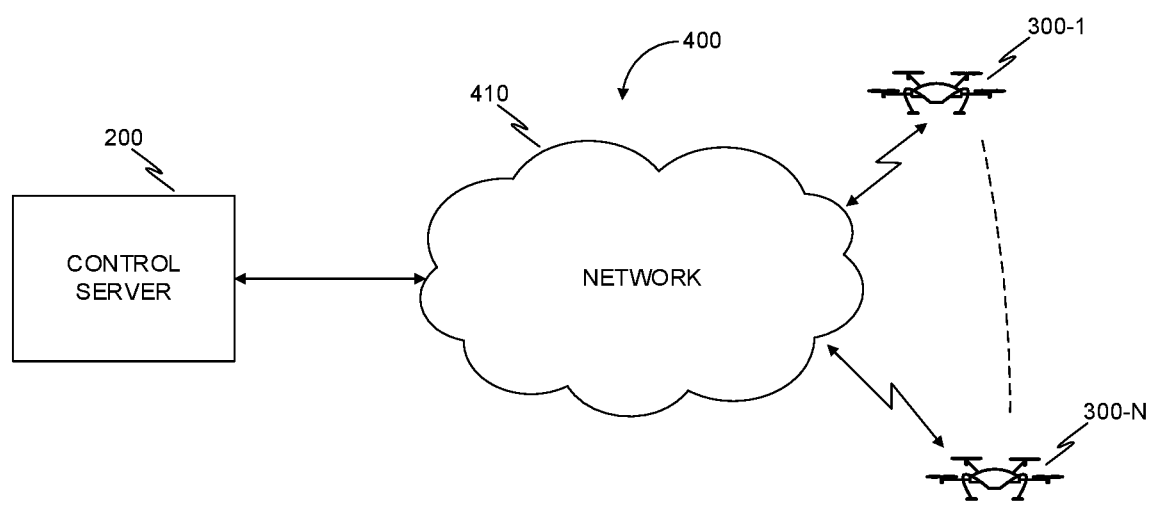
FIG. 4 is a schematic illustration of a network diagram including a control server and a plurality of UAVs, implemented in accordance with an embodiment.

FIG. 4 is an example schematic illustration of a network diagram 400 including a control server 200 and a plurality of UAVs, 300-1 through 300-N, utilized to describe the various disclosed embodiments. A control server 200 is connected to a network 410, for example, via a NIC 230 (shown in FIG. 2). In an embodiment, the network 410 may be configured to provide connectivity of various sorts, as may be necessary, including, without limitation, wired connectivity, wireless connectivity, or both, including, for example, local area network (LAN) connectivity, wide area network (WAN) connectivity, metro area network (MAN) connectivity, worldwide web (WWW) connectivity, Internet connectivity, cellular connectivity, and the like, as well as any combination thereof. The network 410 further provides wireless connectivity to a plurality of UAVs 300-1 through 300-N, where 'N' is an integer having a value of '2' or more. The control server 200 may send navigation instructions to any of the UAVs, 300-1 through 300-N, where such UAVs may or may not navigate in the same topographical area (i.e. a single graph map, as described in detail with respect to FIGS. 1A through 1C, above).

Figure 5:
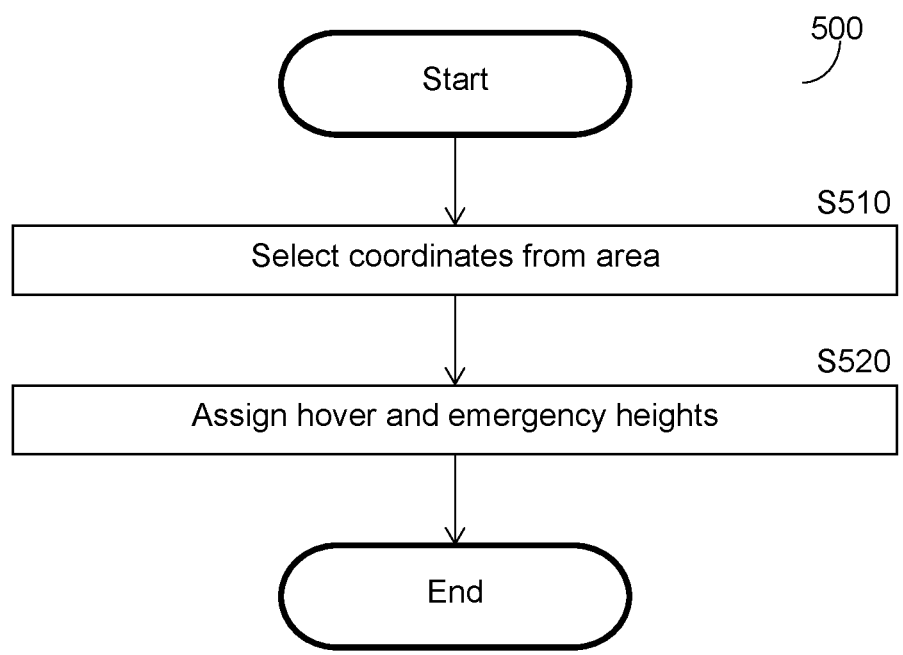
FIG. 5 is a flowchart of a method for generating a waypoint map, implemented in accordance with an embodiment.

FIG. 5 is an example flowchart 500 of a method for generating a waypoint map, implemented in accordance with an embodiment. The method may be performed by the control server, for example.

At S510, one or more coordinate sets are selected from an area. The coordinate sets may be selected from an area of a digital map, such as a digital terrain map. In an embodiment, the coordinates may be selected to correspond to areas including little or no human population or activity. Such locations may be, for example, rooftops, bodies of water, forests, and the like. In some embodiments, one or more waypoints may be added manually by a user of the system. In certain embodiments, the system may provide a plurality of optional waypoints to a user of the system, with the user, then, designating which waypoints to incorporate and which waypoints to exclude. In some embodiments, the system may select waypoints based on aerial distance between the waypoints, such that the distance between a pair of waypoints is under, or equal to, a threshold distance. In some other embodiments, the system may select waypoints such that the distance between the waypoints may be traversed, by a UAV, in less time than a predefined time threshold.

At S520 each coordinate set selected at S510 is assigned a route hover height and an emergency hover height. The route hover height is a height at which the UAV flies in normal operation. In an embodiment, the route hover height may be in between an upper and lower limit, providing for maneuverability of the UAV. The emergency hover height is a height that is lower than the route hover height, to which emergency hover height UAVs may be configured to retreat in case of an aerial emergency situation. The emergency retreat functionality may be provided for rapid UAV relocation within prescribed "safe" conditions such as, for example, in the case that airspace needs to be quickly cleared. Such circumstances could occur, for example and without limitation, due to a VIP airplane flying through an area, due to an emergency landing of a passenger-carrying aircraft which requires maneuvering through the airspace, and the like.

At S520, once a coordinate set is assigned the corresponding route hover height and emergency hover height, the coordinate set, and corresponding hover heights, are defined as a waypoint. Waypoints may be stored in a graph map, which may further include route vectors between the waypoints, indicating a direction of travel between the waypoints. The graph map may be stored in a storage device such as, for example, and without limitation, a storage device of a control server 200.

Figure 6A:
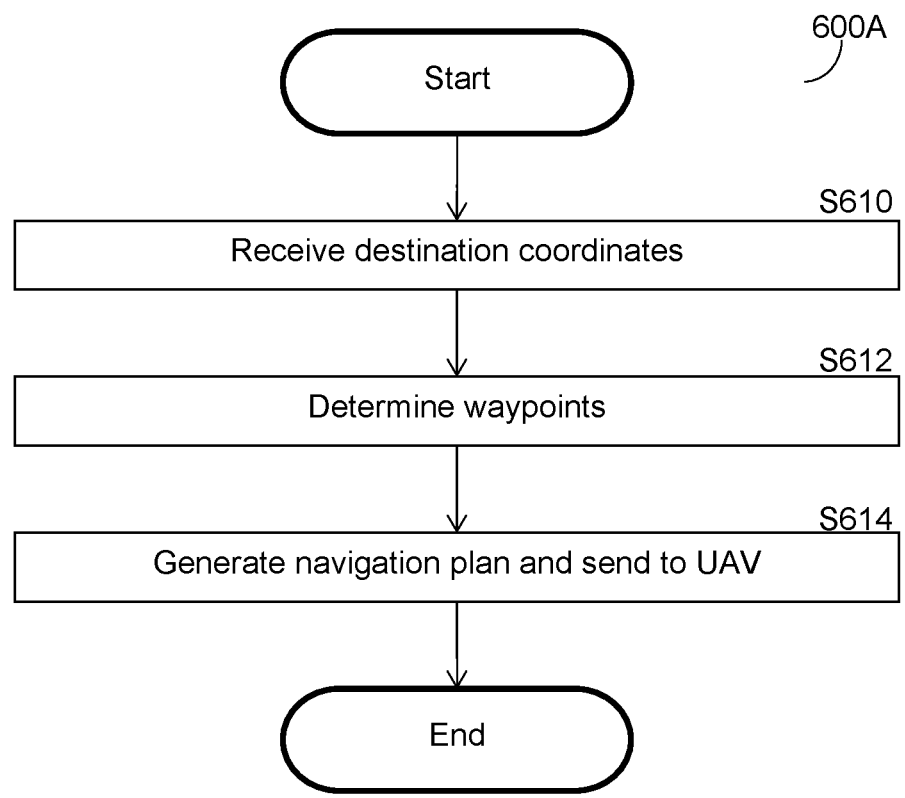
FIG. 6A is a flowchart of a method for generating a navigation plan by a control server, implemented in accordance with an embodiment.

FIG. 6A is an example flowchart 600A of a method for generating a navigation plan by a control server, implemented in accordance with an embodiment.

At S610, destination coordinates are received. Destination coordinates may be coordinates at or near a waypoint. The destination coordinates are typically where a UAV carrying a payload disposes of the payload by delivering the payload to an intended recipient.

At S612, one or more waypoints are determined between an initial location and the destination coordinates. Typically, a plurality of waypoints are determined between the initial location and the destination coordinates. The initial location may be, for example, where the drone payload is loaded. In some embodiments, the initial location may be the destination coordinates of the previous navigation plan. The control server may further determine a route between the waypoints, indicating the order in which the drone should fly to the waypoints. Determination of waypoints at S612 may include generation of a waypoint map, where such generation may be executed in a manner similar or identical to the method described with respect to FIG. 5, above.

At S614, the navigation plan is generated and sent to the UAV for execution of the navigation instructions included in the navigation plan. As noted above, a UAV will only approach a waypoint once the waypoint is locked for the UAV's exclusive use. Where a waypoint is not locked for the UAV's exclusive use, the UAV will hover at its current point until it receives instructions to do otherwise.

Generation of the navigation plan at S614 may include analysis of a waypoint map, such as the map generated at S612, as well as analysis of UAV specifications, flight specifications, other, like, factors, and any combination thereof. Analysis of a waypoint map, as may be included in generation of a navigation plan at S614, may include determination of starting and ending waypoints, determination of waypoint hover and emergency heights, and the like. Further, analysis of a waypoint map may include determination of one or more route vectors, based on factors including, without limitation, waypoint-to-waypoint distance, estimated travel time, and the like, as well as any combination thereof. Further, analysis of a waypoint map in generation of a navigation plan at S614 may also include other, like, analyses, in addition to those described, as well as any combination thereof.

Analysis of UAV specifications in the generation of a navigation plan at S614 may include analysis of factors including, without limitation, UAV payload capacities, UAV maximum speeds, UAV minimum flight altitudes, UAV maximum flight altitudes, UAV energy restrictions, as well as other, like, factors, and any combination thereof. Further, analysis of flight specifications in the generation of a navigation plan at S614 may include analysis of factors including, without limitation, payload weights, payload delivery time restrictions, various flight restrictions, such as maximum altitudes, and the like, other, like, factors, and any combinations thereof.

Based on the described analyses of navigation maps, UAV specifications, flight specifications, and the like, as well as the various combinations thereof, S614 may include generation of one or more navigation plans. Navigation plans may be generated at S614 to include one or more route vectors linking various waypoints, such that the navigation plan includes a takeoff at a loading location waypoint and a landing or unloading at a delivery waypoint.

Further, navigation plans generated at S614 may include specifications of flight variables including, without limitation, height, speed, time, and the like, as well as any combination thereof, providing for generation of navigation plans which provide for navigation within the limitations described with respect to the analyses of UAV, flight, and similar specifications, as described above. Generation of navigation plans at S614 may include generation of navigation plans via automated means, by manual configuration, and any combination thereof. In an embodiment, generation of navigation plans at S614 may include generation of a first, preferred navigation plan, as well as other, secondary, plans. Where generation at S614 includes such generation of primary or preferred plans, such primary or preferred plans may provide for optimal or preferred navigation, while the described secondary plans provide for backup or fallback navigation.

As described hereinabove, navigation plans may be generated and sent, at S614, to one or more UAVs via a variety of means including, without limitation, wireless communications.

In the method described with respect to FIG. 6A, a single navigation plan is discussed. However, it should be understood that a navigation plan may include a plurality of destinations, such that the destination point of a first portion of the navigation plan is an origin point of a second portion of the navigation plan. The UAV may be configured to first perform the first portion of the navigation plan, and then perform the second portion of the navigation plan.

Figure 6B:
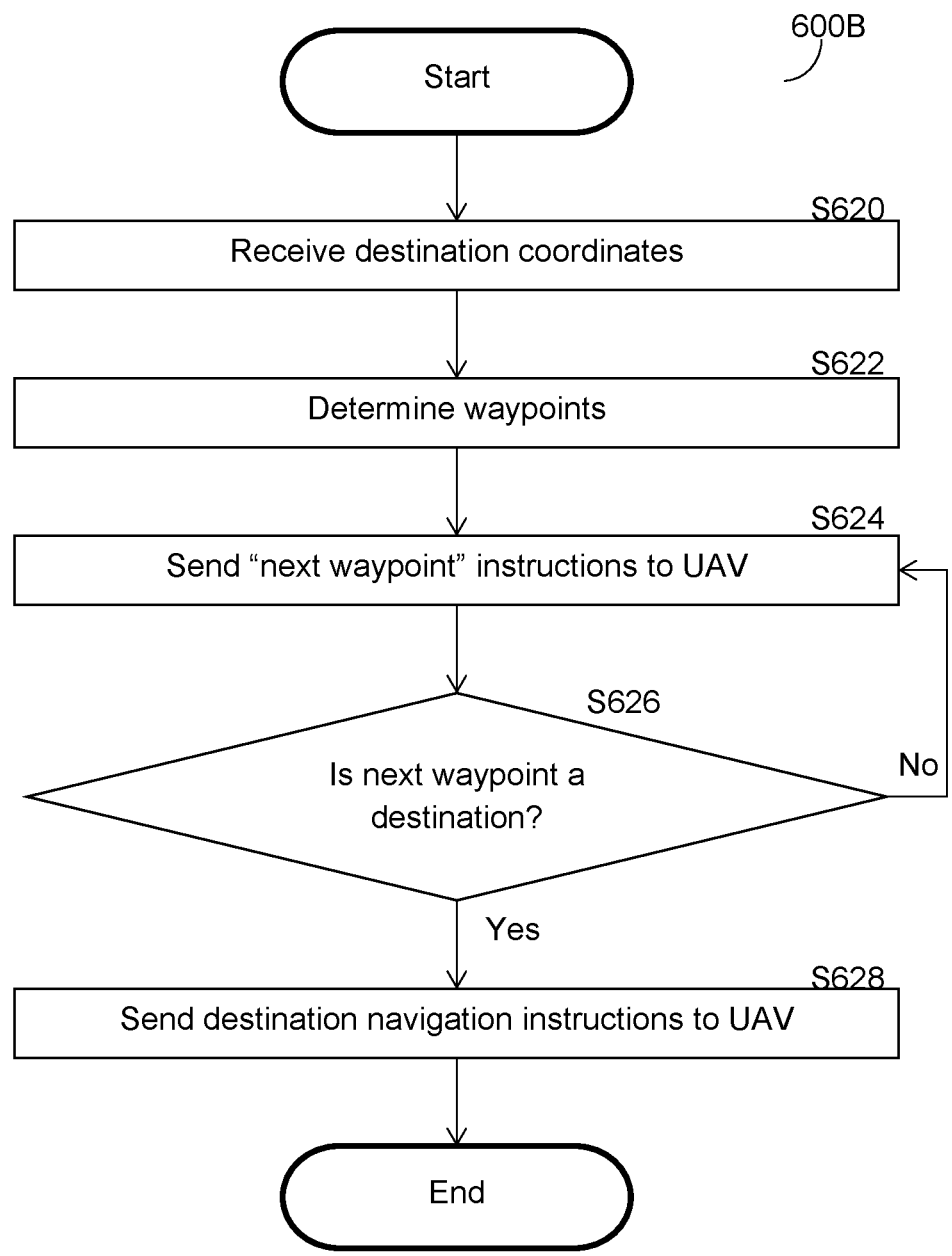
FIG. 6B is a flowchart of a method for providing a navigation plan to a UAV, implemented in accordance with an embodiment.

FIG. 6B is an example flowchart 600B of a method for providing a navigation plan to a UAV, implemented in accordance with an embodiment.

At S620, destination coordinates are received. As noted above, destination coordinates may be coordinates at or near a waypoint. The destination coordinates may be, for example, coordinates at which a UAV carrying a payload disposes of the payload by delivering the payload to its intended recipient.

At S622, one or more waypoints are determined between an initial location and the destination coordinates. Determination of waypoints may be performed in a manner similar or identical to the method described with respect to FIG. 5, above.

At S624, a UAV is sent navigation instructions to navigate to a next waypoint. A next waypoint may be determined based on analysis of one or more navigation plans, such as navigation plans generated in a manner similar or identical to that described with respect to S614 of FIG. 6A, above, as well as other, like, navigation plans, and any combination thereof. Analysis of navigation plans, as may be executed at S620, may include, without limitation, determination of a current UAV position or waypoint, determination of one or more subsequent waypoints, determination of associated route vectors, and the like, as well as any combination thereof. In an embodiment, the UAV may not have the entire flight path, but is provided with the next step as it progresses. In some embodiments, a plurality of next waypoints, in sequence, may be sent to the UAV.

At S626, a check is performed to determine whether the next waypoint is a terminal waypoint. A terminal waypoint a waypoint having coordinates matching destination coordinates received at S610, or coordinates in proximity thereof. If the next waypoint is not a terminal waypoint, execution continues at S624, otherwise execution continues at S640.

At S628, the UAV is sent an instruction to navigate to the destination coordinates (or a terminal waypoint). An instruction to navigate to the destination coordinate may be similar or identical to those instructions sent at S624, where instructions to navigate to the destination coordinates may include a specified destination. In an embodiment, the instruction may further include one or more actions that should be performed at the destination, such as lowering the hover height, releasing a payload, and the like, as well as any combination thereof. By providing the waypoint coordinates one at a time, the system may continuously update the navigation plan as needed, taking into account weather patterns, aerial congestion, and the like.

Figure 7:
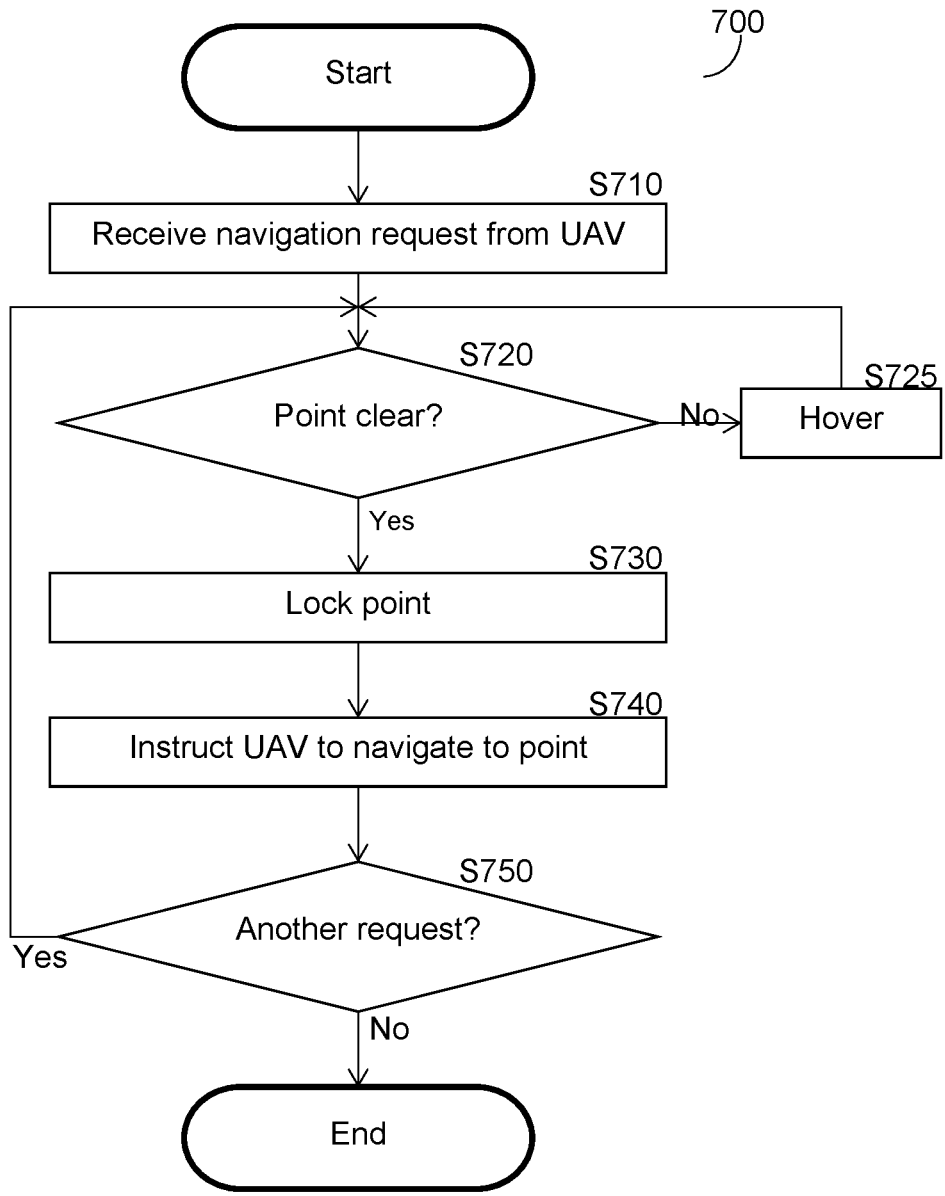
FIG. 7 is a flowchart of a method for UAV route management, implemented in accordance with an embodiment.

FIG. 7 is an example flowchart 700 of a method for UAV route management, implemented in accordance with an embodiment. The method may be performed by the control server, e.g., the control server 200.

At S710, a request is received, from a UAV, for instructions for navigation to a waypoint. The request may be received after a navigation plan is uploaded to the UAV, or, in another embodiment, in conjunction with the UAV arriving at one waypoint on the way to another waypoint.

At S720, a check is performed to determine if the waypoint is clear. A waypoint may be locked if it is in use by another UAV, where the other UAV may be hovering at the waypoint, or in between the waypoint and another waypoint.

If the waypoint is not clear (i.e. the waypoint is locked), execution continues at S725. If the waypoint is clear, execution continues at S730.

At S725, the UAV is instructed to hover at its current location (waypoint) until an instruction is sent that the waypoint is locked for the UAV. The hover instruction issued at S725 may include, without limitation, instructions specifying that the UAV enter a designated hover mode, instructions specifying that the UAV maintain a specific altitude, including an altitude equal to a hover height associated with a current waypoint, and the like, as well as any combination thereof. In certain embodiments, the UAV may be configured to periodically request access to the waypoint. As each waypoint also functions as an emergency landing site, the UAV may be configured to hover at the waypoint until such a time as the system determines that the next waypoint may be locked for the UAV, or until the control server determines that the UAV must perform an emergency landing at the current waypoint, due, for example, to insufficient energy levels.

At S730, the waypoint is locked for the UAV. A locked waypoint cannot be used by a UAV other than the UAV for which the waypoint is locked. A waypoint may be locked by updating the status of the given waypoint to "locked" in one or more navigation plans, navigation maps, and the like, as well as any combination thereof, providing for reduction of collision possibilities, and for assurance that every UAV has at least one dedicated waypoint that only it may occupy, providing for at least one emergency landing site for each UAV.

At S740, an instruction is sent to the UAV to navigate to the waypoint, in response to the waypoint being locked for exclusive use by the UAV. The navigation instruction sent at S740 may be an instruction similar or identical to the instruction generated and sent according to the method described with respect to FIG. 6B, above.

At S750, a check is performed to determine if another navigation request is received. If another navigation request is received, execution continues at S720, otherwise execution terminates. A UAV may request that a next waypoint be locked for its use while it is in route to a current waypoint. In an example, such as in FIG. 1B, the UAV 300 may request that waypoint 130 be locked prior to reaching waypoint 120, so that a smooth transition may occur without having the UAV hover at a waypoint while awaiting authorization. In an embodiment, the request may be sent within a certain amount of time from when the UAV departs the previous waypoint, or a certain amount of time prior to arriving at the next waypoint. In some embodiments, the server may lock one or more waypoints prior to the UAV's arrival, without receiving a request from the UAV. This may be accomplished by the control server monitoring the progression of the UAV based on the navigation plan, for example, by receiving, constantly or periodically, positioning coordinates, and determining, based on the received positioning coordinates, when to lock a waypoint at which the UAV has not yet arrived.

Figure 8:
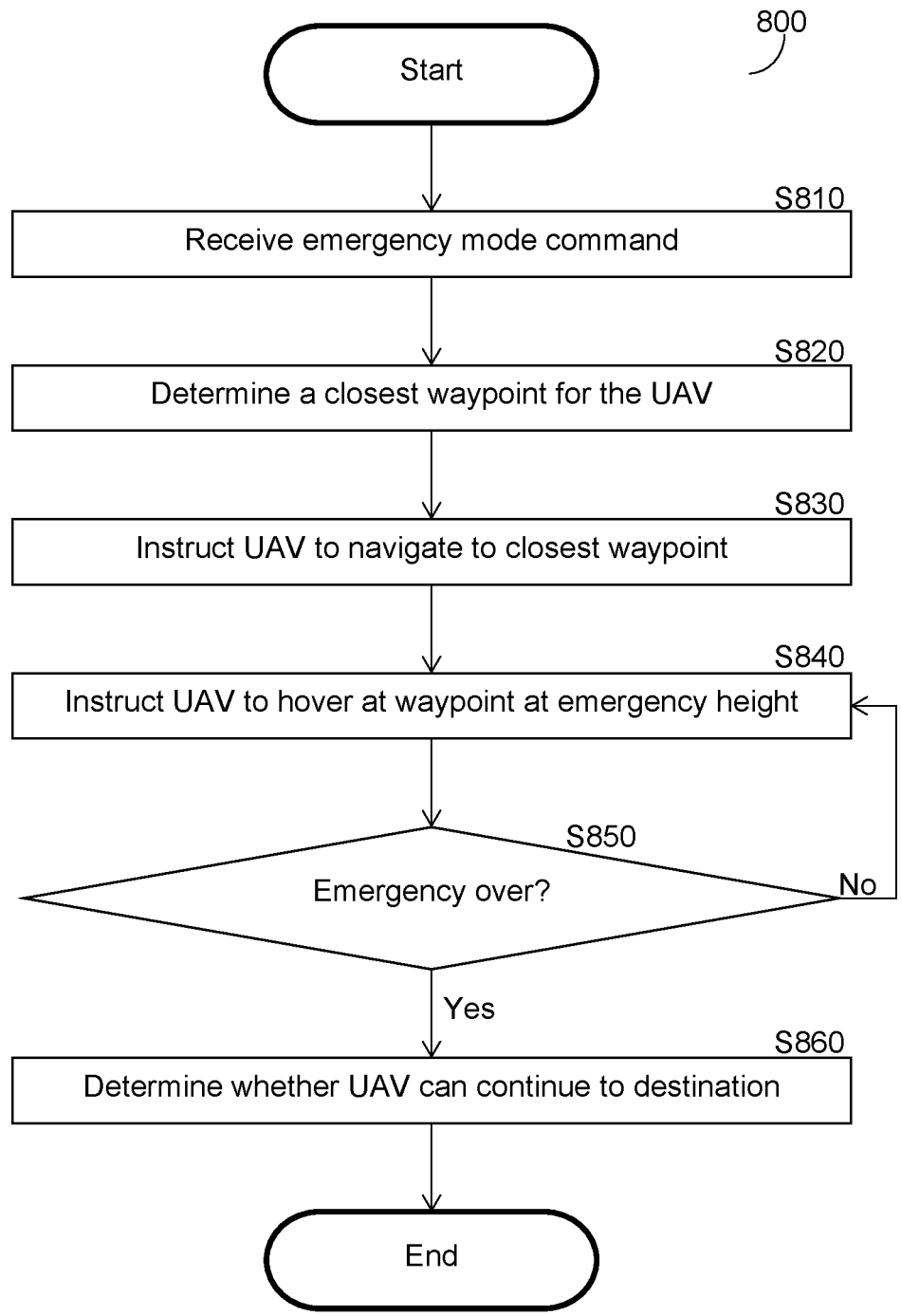
FIG. 8 is a flowchart of a method for UAV route management employing an emergency protocol, implemented in accordance with an embodiment.

FIG. 8 is an example flowchart 800 of a method for UAV route management employing an emergency protocol, implemented in accordance with an embodiment. The method is performed by a control server, e.g., the server 200, of FIG. 2, above.

At S810, a command to initiate an emergency mode is received. The command may be received from one or more sources including, without limitation, one or more UAVs, other servers, other, like, sources, and any combination thereof. The purpose of the emergency mode is to clear the airspace in which the UAVs, controlled by the control server, are navigating. While the term emergency mode is used herein, it should be readily understood that the teachings herein may apply to any instance in which airspace should be cleared, whether or not an actual emergency is occurring.

At S820, for each UAV communicatively coupled with the control server, a closest waypoint is determined. For some UAVs, the closest waypoint may be the waypoint the UAVs most-recently left, in which case the UAVs will be instructed to return to the same waypoint. In other cases, the waypoint may be the waypoint at which the UAVs are currently located, or the UAVs' current destination. As the waypoints are locked for each UAV, respectively and in a unique manner (no two UAVs have a lock on a single waypoint), collisions between UAVs may be avoided. In some embodiments, a UAV may be configured to determine the closest waypoint on its own, based on the path that the UAV is currently traversing. In such cases, rather than send a large amount of instructions (at least one instruction per UAV controlled by the control server), a single message may be broadcast, at S830, to all UAVs, wherein the message specifies entry into emergency mode.

In other embodiments, such a single command may be disadvantageous, as a security flaw or system breach may lead to a single bad actor disrupting a UAV fleet. While service would be disrupted, it should be readily appreciated that harm to humans is kept to a minimum, as each waypoint is already designated as a safe emergency landing location. In such cases, similar mass messages may be avoided during the execution of the method described with respect to FIG. 8.

At S830, an instruction is sent to navigate to the determined closest waypoint. As noted above, the instruction may be sent as a single instruction set, or as a batch of instructions directed each at a particular UAV. Instructions to navigate to a determined closest waypoint may be instructions similar or identical to those navigation instructions described hereinabove.

At S840, the UAVs are instructed to hover at the waypoint's emergency height. In some embodiments the instructions sent at S830 and S840 may be combined to a single instruction for all drones, a single instruction per drone, and the like.

At S850, a check is performed to determine whether the emergency is over. If the emergency is not over, the UAVs continue to hover at the UAVs' respective waypoints at the waypoints' respective emergency hover heights. In an embodiment, the drones may be configured such that, when a drone lacks power in its energy storage to continue hovering for a defined period of time, the drone may initiate an emergency landing and land at the coordinates of the waypoint and await retrieval by a human operator. If the emergency is over, execution continues at S860, where a determination is made as to whether each UAV can continue to its destination coordinates.

At S860, it is determined whether each UAV can continue to its destination coordinates. If the control server determines that a UAV cannot continue, it may instruct the UAV to perform an emergency landing at the respective waypoint coordinates. If the UAV can continue, then operation is resumed, for example, such as is described in FIG. 7, above. In some embodiments, the control server may determine that the UAV should return to an origin point by determining a shortest route, where the shortest route may be based on distance, a number of waypoints, the speed at which the UAV is able to return to the origin point, and the like, as well as any combination thereof.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for aerial traffic management of unmanned aerial vehicles (UAVs), comprising:
   receiving at least a navigation request from a UAV of a plurality of UAVs, wherein the navigation request specifies at least a waypoint;
   determining whether the waypoint is clear;
   sending an instruction to the UAV to hover at a specified position until the waypoint is clear, when the received waypoint is not clear;
   locking the waypoint for the UAV, when the received waypoint is clear; and
   instructing the UAV to navigate to the received waypoint.

2. The method of claim 1, further comprising:
   when the received waypoint was not clear, periodically checking whether the received waypoint has been cleared;
   locking the waypoint, for the UAV when the received waypoint has become clear; and
   instructing the UAV to navigate to the received waypoint.

3. The method of claim 1, wherein the instruction defines at least one action to be performed at a destination by the UAV, wherein the at least one action is any one of: lowering a hover height, and releasing a payload.

4. The method of claim 1, further comprising:
   generating a navigation plan.

5. The method of claim 4, wherein generating the navigation plan further comprises:
   receiving at least a set of destination coordinates included in a digital terrain map; and
   determining, based on the received destination coordinates, a plurality of waypoints from an origin to a destination.

6. The method of claim 5, further comprising:
   providing the navigation plan to the UAV.

7. The method of claim 6, further comprising:
   determining whether a subsequent waypoint based on the navigation plan, of the at least one waypoint, is a destination waypoint, where, if the subsequent waypoint is a destination waypoint, destination instructions are sent to the UAV.

8. The method of claim 1, further comprising:
   employing an emergency protocol on the UAV in a response to an emergency command.

9. The method of claim 1, further comprising:
   instructing the UAV to hover at the received waypoint's emergency height, until an emergency event is over.

10. A non-transitory computer readable medium having stored thereon instructions for a process for aerial traffic management of unmanned aerial vehicles (UAVs), the process comprising:
    receiving at least a navigation request from a UAV of a plurality of UAVs, wherein the navigation request specifies at least a waypoint;
    determining whether the waypoint is clear;
    sending an instruction to the UAV to hover at a specified position until the waypoint is clear, when the received waypoint is not clear;
    locking the waypoint for the UAV, when the received waypoint clear; and
    instructing the UAV to navigate to the received waypoint.

11. A system for aerial traffic management of unmanned aerial vehicles (UAVs), comprising:
    a processing circuitry; and
    a memory, the memory containing instructions that, when executed by the processing circuitry, configure the system to:
    receive at least a navigation request from a UAV of a plurality of UAVs, wherein the navigation request specifies at least a waypoint;
    determine whether the waypoint is clear;
    send an instruction to the UAV to hover at a specified position until the waypoint is clear, when the received waypoint is not clear;
    lock the waypoint for the UAV, when the received waypoint is clear; and
    instruct the UAV to navigate to the received waypoint.

12. The system of claim 11, wherein the system is further configured to:
    when the received waypoint was not clear, periodically check whether the received waypoint has been cleared;
    lock the waypoint, when the received waypoint has become clear; and
    instruct the UAV to navigate to the received waypoint.

13. The system of claim 11, wherein the instruction defines at least one action to be performed at a destination by the UAV, wherein the at least one action is any one of: lowering a hover height, and releasing a payload.

14. The system of claim 11, wherein the system is further configured to:
   generate a navigation plan.

15. The system of claim 14, wherein the system is further configured to:
   receive at least a set of destination coordinates included in a digital terrain map; and
   determine, based on the received destination coordinates, a plurality of waypoints from an origin to a destination.

16. The system of claim 15, wherein the system is further configured to:
   provide the navigation plan to the UAV.

17. The system of claim 16, wherein the system is further configured to:
   determine whether a subsequent waypoint based on the navigation plan, of the at least one waypoint, is a destination waypoint, where, if the subsequent waypoint is a destination waypoint, destination instructions are sent to the UAV.

18. The system of claim 11, wherein the system is further configured to:
   employ an emergency protocol on the UAV in a response to an emergency command.

19. The system of claim 11, wherein the system is further configured to:
   instruct the UAV to hover at the received waypoint's emergency height, until an emergency event is over.

* * * * *